United States Patent [19]

Hori et al.

[11] Patent Number: 4,482,812
[45] Date of Patent: Nov. 13, 1984

[54] ENGINE AUTOMATIC CONTROL SYSTEM FOR VEHICLES

[75] Inventors: Shinichi Hori, Anjo; Yasuichi Ohnishi; Makoto Ono, both of Kariya; Masahiro Ueda; Masahiko Noba, both of Toyota, all of Japan

[73] Assignees: Nippondenso Co., Ltd., Kariya; Toyota Jidosha Kabushiki Kaisha, Toyota, both of Japan

[21] Appl. No.: 398,879

[22] Filed: Jul. 16, 1982

[30] Foreign Application Priority Data

Jul. 21, 1981 [JP] Japan .................................. 56-114167

[51] Int. Cl.³ ........................ H02P 9/04; F02N 11/00; F02N 17/02
[52] U.S. Cl. ..................................... 290/38 R; 290/48; 290/38 C; 290/37 R; 290/30 R; 123/179 B
[58] Field of Search ................. 290/30 R, 30 A, 30 B, 290/34, 51, DIG. 1, DIG. 3, 38 C, 38 R, 37 R, 48; 123/179 B

[56] References Cited

U.S. PATENT DOCUMENTS

| | | | |
|---|---|---|---|
| 3,668,411 | 6/1972 | Leger | 290/37 X |
| 3,675,033 | 7/1972 | Richard et al. | 290/37 X |
| 3,731,108 | 5/1973 | Kobara et al. | 290/37 X |
| 3,872,316 | 3/1975 | Kurii et al. | 290/38 |
| 3,949,236 | 4/1976 | Kurii et al. | 290/38 R |
| 4,286,683 | 9/1981 | Zeigner et al. | 123/179 B X |
| 4,364,343 | 12/1982 | Malik | 123/179 B |
| 4,377,137 | 3/1983 | Amano et al. | 123/179 B |
| 4,397,281 | 8/1983 | Nakano et al. | 123/179 B X |
| 4,402,286 | 9/1983 | Pagel et al. | 123/179 B |

Primary Examiner—John Gonzales
Assistant Examiner—Terry Flower
Attorney, Agent, or Firm—Cushman, Darby & Cushman

[57] ABSTRACT

An engine automatic control system for vehicles is adapted to automatically stop the engine when the vehicle motion is arrested, to automatically start the engine in response to operation of a starting mechanism for effecting start of the vehicle, and to maintain the engine rotation after start of the vehicle in dependence upon change of the level of speed pulses from a speed sensor assembly. The control system is arranged to be ineffective in its function for automatic stop of the engine when the speed sensor assembly is inoperative to maintain the engine rotation under the operative condition of the control system.

7 Claims, 4 Drawing Figures

ENGINE AUTOMATIC CONTROL SYSTEM FOR VEHICLES

BACKGROUND OF THE INVENTION

The present invention relates to an engine automatic control system for automotive vehicles, and more particularly to such engine automatic control systems as disclosed in U.S. Pat. Nos. 3,731,108; 3,872,316; and 3,949,236; wherein the engine is automatically stopped when the motion of the vehicle is stopped and is automatically driven in response to operation of a starting mechanism such as an accelerator pedal or clutch pedal for effecting start of the vehicle, these operations being carried out without operating an ignition switch of the engine.

In such engine automatic control systems as described above, the motion of the vehicle is detected by a speed sensor assembly such that an engine control circuit for the system is maintained in its activated condition in dependence upon change of the level of speed pulses from the sensor assembly to maintain the engine in its operative condition after start of the vehicle. For example, the speed sensor assembly includes a disk of permanent magnet and a reed-switch in magnetic coupling with projections formed on the outer periphery of the disk. The disk is fixed to a rotary member such as a speedometer cable which is arranged to be driven by an output shaft of a power transmission of the vehicle. When the disk is rotated in driving operation of the speedometer cable, the reed-switch acts to detect each projection of the disk so as to produce a series of speed pulses corresponding with the actual speed of the vehicle. In operation of the above control systems, it is, therefore, presumable that if the speed sensor assembly is out of order due to disconnection of the speedometer cable, damage of the reed-switch or the like prior to start of the vehicle, the engine is automatically stopped resulting in unexpected trouble of the operator.

SUMMARY OF THE INVENTION

Accordingly, the primary object of the present invention is to provide an engine automatic control system which is capable of reliably maintaining the engine control circuit in its activated condition after start of the engine irrespectively of unexpected damage of the speed sensor assembly.

In the present invention, the primary object is accomplished by a control system for controlling the operation of a vehicle prime mover having setting means for providing a set signal for control of the operation of the prime mover, a starter control circuit which in its activated condition connects a starter motor of the prime mover to an electric power source and in its deactivated condition disconnects the starter motor from the power source, a drive control circuit which in its deactivated condition maintains the operative condition of the prime mover and in its activated condition automatically renders the prime mover inoperative, a mechanism such as an accelerator pedal or clutch pedal for effecting movements of the vehicle and detecting means for generating an electric signal indicative of motion of the vehicle. The control system comprises an electric control device which includes first means for activating the starter control circuit in response to operation of the movement mechanism and for deactivating the starter control circuit in response to operation of the prime mover, and second means for maintaining the drive control circuit in its deactivated condition in dependence upon the electric signal from the detecting means and for activating the drive control circuit when the level of the electric signal from the detecting means does not change during a stopping of the vehicle. The electric control device further includes means for enabling the performance of the functions of the starter and drive control circuits in response to the set signal from the setting means and the electric signal from the detecting means and for disabling the performance of the functions of the starter and drive control circuits when the level of the electric signal does not change during movement of the vehicle.

It is preferable that the detecting means is a speed sensor assembly for generating a series of speed pulses responsive to an actual speed of the vehicle, and the electric control device is arranged to enable the performance of the functions of the starter and drive control circuits in response to the set signal and the speed pulses and to disable the performance of the functions of the starter and drive control circuits when the level of the speed pulses does not change during movement of the vehicle.

BRIEF DESCRIPTION OF THE DRAWINGS

Additional objects and advantages of the present invention will be more apparent from the following detailed description of a preferred embodiment thereof when taken together with the accompanying drawings in which.

DETAILED DESCRIPTION OF THE PREFERRED EMBODIMENT

Figure 1:
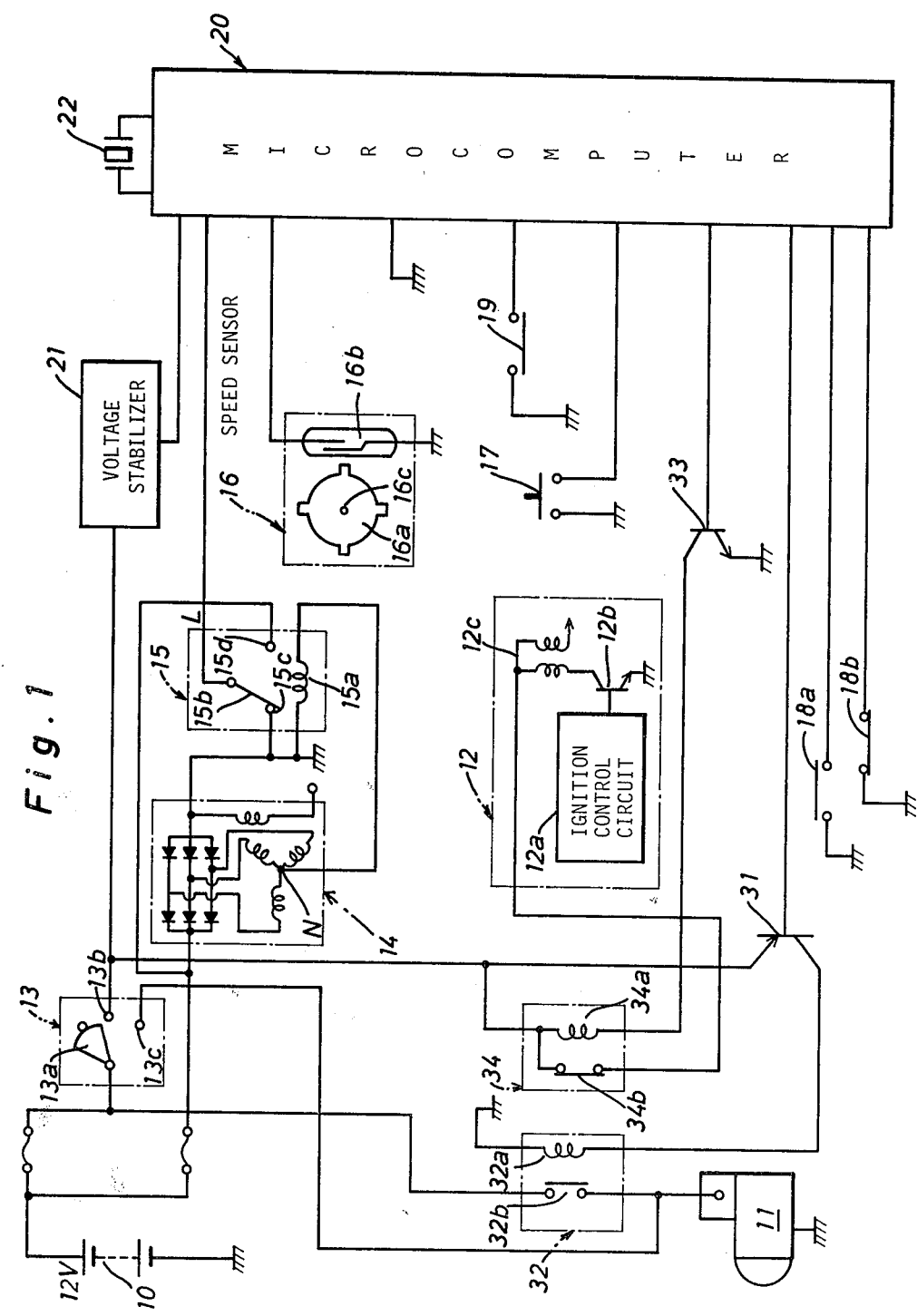
FIG. 1 is a block diagram of an engine automatic control system in accordance with the present invention.

Referring now to the drawings, particularly in FIG. 1, the reference numeral 11 designates a starter motor for an internal combustion engine, and the reference numeral 12 designates an ignition circuit for the engine. The starter motor 11 is connected to an electric DC power source 10 in the form of a vehicle battery through an ignition switch 13. When a movable contact 13a of switch 13 is temporarily connected to a fixed contact 13c, the starter motor 11 is operated by supply of an electric current from power source 10 to effect cranking operation of the engine. The ignition circuit 12 includes a control circuit 12a and an ignition coil 12c connected to the control circuit 12a through a transistor 12b. The control circuit 12a is connected to a signal generator which is assembled within a distributor of the engine. The transistor 12b is energized in response to an electric signal from the signal generator under control of the control circuit 12a and is deenergized in response to disappearance of the electric signal from the signal generator. The ignition coil 12c is energized in response to energization of the transistor 12b and generates a spark voltage upon deenergization of the primary winding thereof caused by deenergization of the transistor 12b, the spark voltage being applied to the distributor of the engine.

Connected between the power source 10 and a regulator relay 15 is an alternator 14 which is arranged to generate an AC voltage at a neutral point of the stator-coil thereof when driven by the engine and to convert it to a DC voltage to be applied to the power source 10. The regulator relay 15 includes an electromagnetic coil 15a and a movable contact 15b which is selectively connected to an earth terminal 15c and a fixed contact 15d. The electromagnetic coil 15a is connected at its opposite ends to the neutral point N of the stator-coil and the earth terminal 15c, and the fixed contact 15d is connected to the power source 10. During deenergization of the electromagnetic coil 15a, the movable contact 15b is connected to the earth terminal 15c to generate a low level voltage $L_o$ at its output terminal L. When the electromagnetic coil 15a is energized by an AC voltage appearing at the neutral point N of the stator-coil, the movable contact 15b is connected to the fixed contact 15d to generate a high level voltage at its output terminal L.

A microcomputer 20 is connected to the regulator relay 15, a speed sensor 16, a setting switch 17, first and second clutch switches 18a, 18b and a door switch 19. The speed sensor 16 includes a disk 16a permanently magnetized and a reed-switch assembly 16b magnetically coupled with each projection of disk 16a. The disk 16a is fixed to a speedometer cable 16c which is arranged to be driven by an output shaft of a power transmission of the vehicle. When the disk 16a is rotated in driving operation of the speedometer cable 16c, the reed-switch 16b acts to magnetically detect each projection of the disk 16a so as to produce a series of speed pulses corresponding with the actual speed of the vehicle. The setting switch 17 is in the form of a normally open switch of the self-return type which is arranged at an appropriate place in the passenger compartment of the vehicle to produce a set signal therefrom when temporarily closed. Both the clutch switches 18a and 18b are associated with a clutch pedal of the vehicle. The first clutch switch 18a is in the form of a normally open switch which is arranged to be closed by full depression of the clutch pedal to produce a first clutch signal therefrom, while the second clutch switch 18b is in the form of a normally closed switch which is arranged to be opened in response to depression of the clutch pedal to produce a second clutch signal therefrom. The second clutch signal disappears in response to release of the clutch pedal. The door switch 19 is in the form of a normally closed switch which is arranged in a vehicle door structure to be closed by opening of the vehicle door to produce a door signal therefrom. The door signal disappears in response to closing of the vehicle door.

Figure 3:
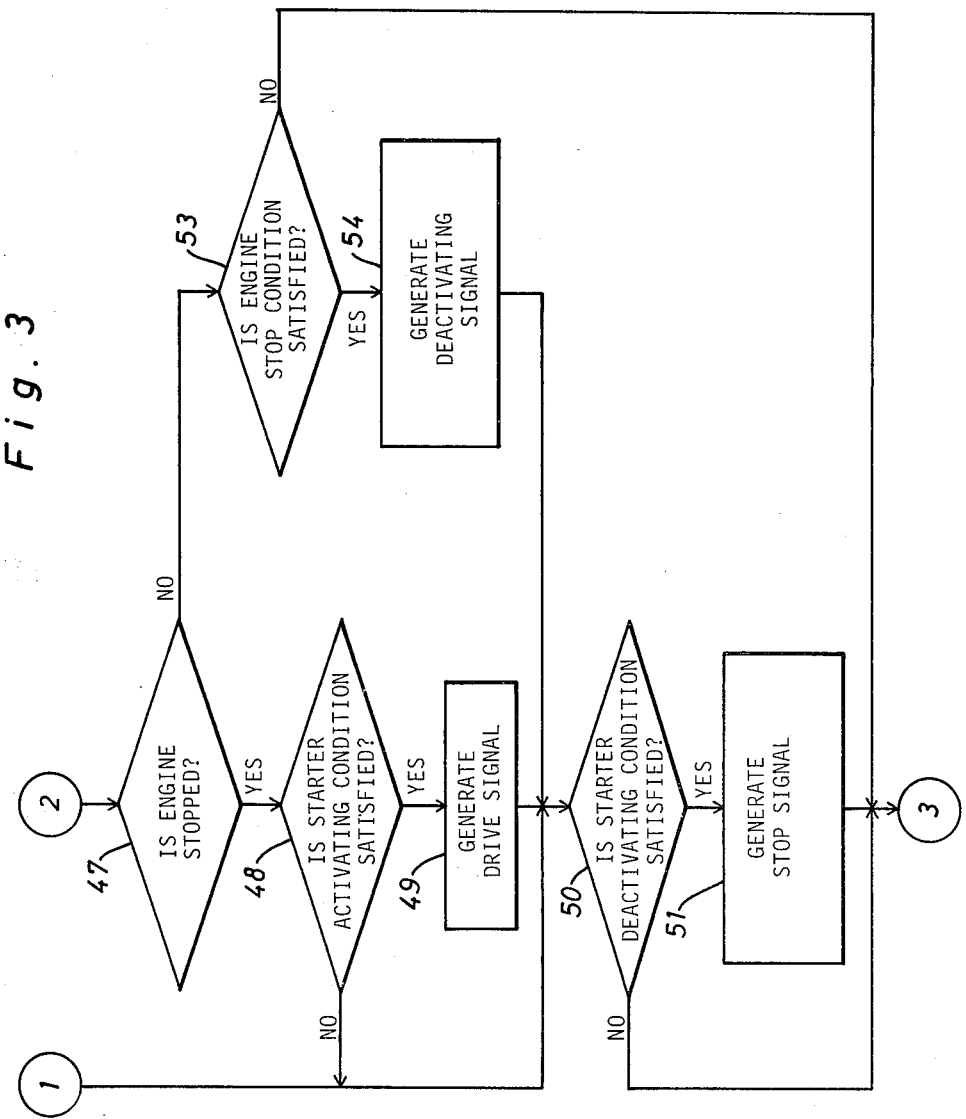
Figure 4:
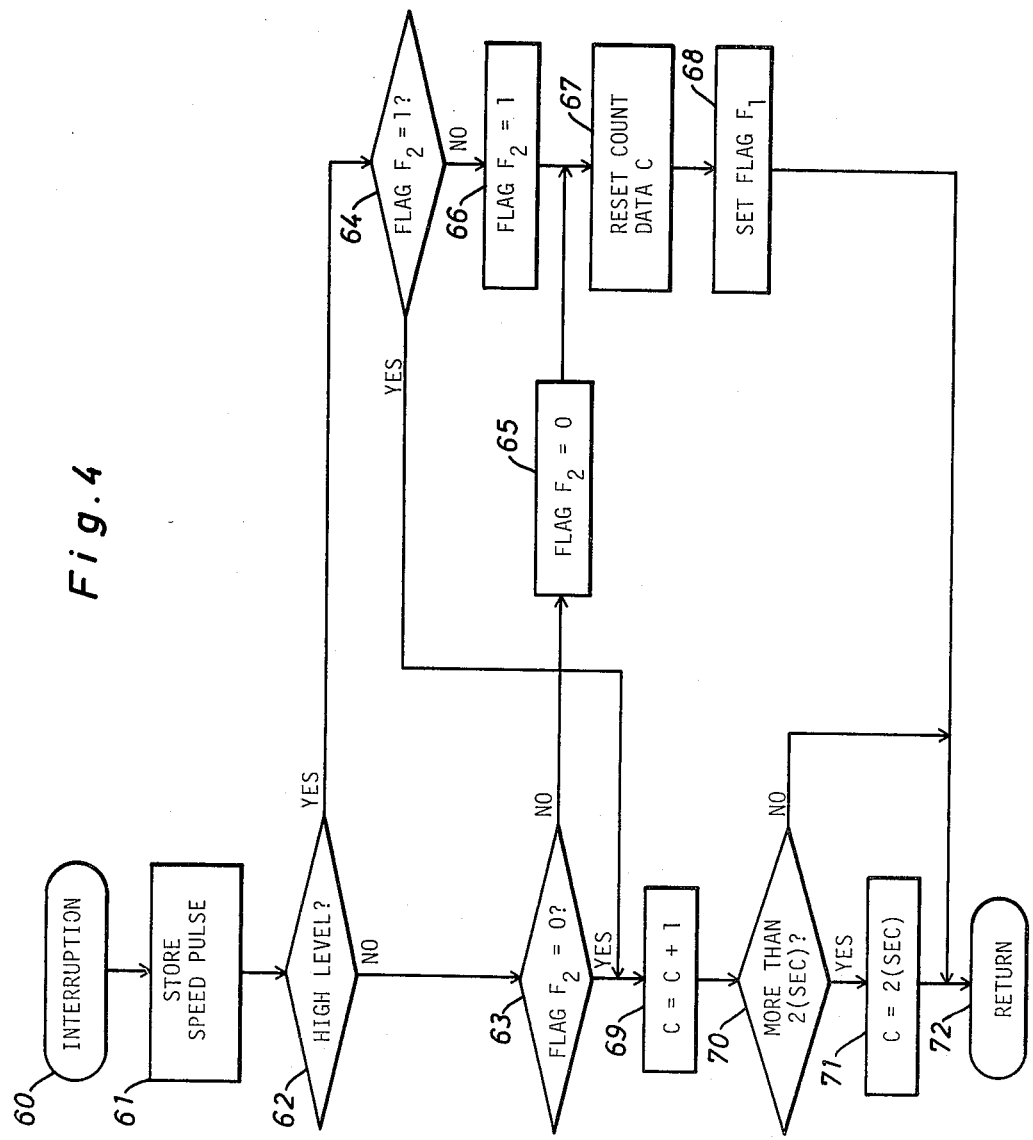
FIG. 4 is a flow-chart illustrating an interruption control program executed by the microcomputer.

The microcomputer 20 is arranged to be ready for its operation in response to the constant voltage (for instance 5 volt) from a voltage stabilizer 21 when the ignition switch is closed. The computer 20 comprises a central processing unit or CPU, an input-output device or I/0, a read only memory or ROM, a random access memory or RAM and a clock circuit which are connected to each other through a bus line. The I/0 receives the low or high level voltage $L_o$ or $H_i$ from regulator relay 15, speed pulses from sensor 16, a set signal from setting switch 17, clutch signals from first and second clutch switches 18a, 18b and a door signal from door switch 19 to apply them to the RAM. The clock circuit cooperates with a crystal oscillator 22 to produce clock signals at a predetermined frequency. The ROM is arranged to previously store a main control program and an interruption control program illustrated by each flow-chart in FIGS. 2 to 4, which programs are executed by the CPU in the computer 20 as will be described in detail later.

The CPU includes an interruption timer which acts to initiate calculation of a predetermined period of time, for instance 1 milli-second, in response to start of the computer 20 and is reset upon lapse of the period of time to resume the time calculation. Thus, the CPU acts to execute the main control program in response to the clock signals from the clock circuit and ceases the execution of the main control program upon each lapse of the predetermined period of time to execute the interruption control program. During such alternative execution of the control programs, the computer 20 produces output signals necessary for activating or deactivating the starter motor 11 and for energizing or deenergizing the ignition coil 12c. In this instance, the execution of the main control program is repetitively carried out by the CPU within 10 milli-seconds after each execution of the program.

The computer 20 is further connected to a starter relay 32 and an ignition relay 34 respectively through transistors 31 and 33. The transistor 31 is connected at its base to the I/0 of computer 20 and at its emitter to the fixed contact 13b of ignition switch 13 to be energized by receiving a drive signal from the CPU of the computer during closure of ignition switch 13 and to be deenergized in response to a stop signal from the CPU of the computer. The transistor 33 is grounded at its emitter and connected at its base to the I/0 of the computer 20 to be deenergized by recieving an activating signal from the CPU of the computer and to be energized by receiving a deactivating signal from the CPU of the computer, as will be described in detail later. The starter relay 32 includes an electromagnetic coil 32a and a normally open contact 32b. The electromagnetic coil 32a is grounded at one end thereof and connected at the other end thereof to the collector of transistor 31 to be energized by supply of an electric current from the power source 10 during energization of the transistor 31 and to be deenergized in response to deenergization of the transistor 31. The normally open contact 32b of relay 32 is interposed between the power source 10 and starter motor 11 to be closed in response to energization of coil 32a to connect the starter motor 11 with the power source 10. The normally open contact 32b returns to its open position in response to deenergization of coil 32a to disconnect the starter motor 11 from the power source 10.

The ignition relay 34 includes an electromagnetic coil 34a which is connected at its one end to the fixed contact 13b of ignition switch 13 and at its other end to the collector of transistor 33 to be deenergized during deenergization of transistor 33 and to be energized by supply of an electric current from the power source 10 in response to energization of transistor 33. The ignition relay 34 also includes a normally closed contact 34b which is maintained in its closed position during deenergization of coil 34a to permit supply of the electric current to the ignition coil 12c from the power source 10. When the electromagnetic coil 34a is energized, the normally closed contact 34b is opened to disconnect the ignition coil 12c from the power source 10.

Figure 2:
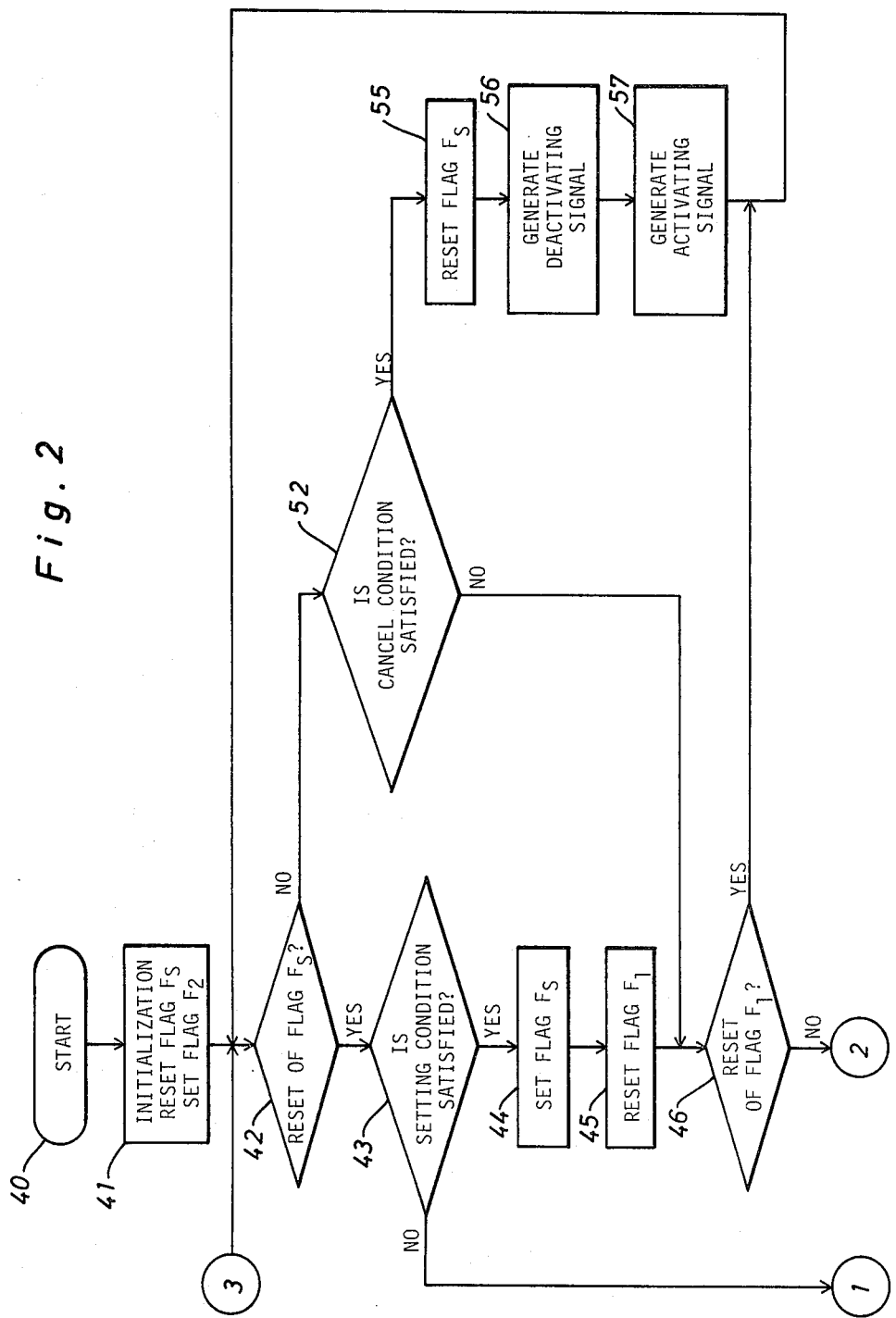
FIGS. 2 and 3 are flow-charts illustrating a main control program executed by the microcomputer of FIG. 1.

In operation, when the movable contact 13a of ignition switch 13 is connected to the fixed contact 13b when the vehicle is stopped, the computer 20 is conditioned in its operation by receiving the constant voltage from stabilizer 21 to operate the interruption timer of the CPU and to initiate the execution of the main control program at a step 40 of the flow-chart shown in FIG. 2. Subsequently, when the movable contact 13a of ignition switch 13 is temporarily connected to the fixed contact 13c, the starter motor 11 cooperates with the ignition circuit 12 to start the engine. Under such condition, the regulator relay 15 generates a high level voltage therefrom under control of the alternator 14, and the speed sensor 16 is still maintained in its deactivated condition due to stopping of the vehicle.

When the main control program proceeds to a step 41 under the above condition, the CPU acts to initialize the computer 20, to reset a flag $F_s$ and to set a flag $F_2$. At this stage, the actual level of speed pulses is a low level because the reed-switch 16b of sensor 16 is closed by magnetic coupling with disk 16a. Successively, the main control program proceeds to a step 42 where the CPU determines whether the flag $F_s$ is reset or not. In this embodiment, the flag $F_s$ represents the fact that a setting condition for automatic start and stop control of the engine is satisfied. The setting condition is arranged to be satisfied by such three factors as generation of a high level voltage from regulator relay 15, removal of the door signal generated depending on the status of door switch 19 and generation of a set signal from the setting switch 17. When the answer at step 42 is determined to be "YES" because of the reset flag $F_s$ the main control program proceeds to a step 43 where the CPU determines whether the setting condition is satisfied or not. At this stage, the answer to this question is determined to be "NO" because at least the setting switch 17 is in its inoperative position, and then the main control program proceeds to a step 50 where the CPU determines whether or not a condition for deactivation of the starter motor 11 is satisfied. In this embodiment, the condition for deactivation of the starter motor 11 is arranged to be satisfied by generation of a high level voltage $H_i$ from the regulator relay 15. At this stage, the answer at step 50 is determined to be "YES" because the regulator relay 15 generates a high level voltage $H_i$ therefrom due to start of the engine, and then the CPU returns the main control program to the step 42 through a step 51. During such execution of the main control program, the CPU acts to cease the execution of the main control program upon each lapse of the predetermined period of time or 1 millisecond defined by the interruption timer and acts to execute the interruption control program shown in FIG. 4.

Assuming that the vehicle door is closed to remove a door signal which has been previously produced from the door switch 19 and that the setting switch 17 is temporarily actuated to produce a set signal therefrom, the CPU determines "YES" as answer at step 43 because of satisfaction of the setting condition for automatic start and stop control of the engine. Then, the CPU acts to set the flag $F_s$ at a step 44, and the main control program proceeds to the following step 45 to reset a flag $F_1$ which represents the fact that the level of speed pulses from sensor 16 changes. When the main control program proceeds to a step 46 through step 45, the CPU determines a "YES" answer on a basis of the reset flag $F_1$ to return the program to the step 42. Then, the CPU determines a "NO" answer at the step 42 in dependence upon the set flag $F_s$, and the control program proceeds to a step 52 for determining a condition for cancel of the setting condition. In this embodiment, the cancel condition is arranged to be satisfied by either generation of the door signal from door switch 19 or generation of the set signal from setting switch 17 under setting of the flag $F_s$. Thus, the CPU determines a "NO" answer at step 52 due to lack of both the door and set signals, and the control program returns to the step 42 through step 46.

When the vehicle is started to travel along a road, the actual travelling speed of the vehicle is detected by speed sensor 16 sequentially as a speed pulse which is applied to the computer 20. If, at this stage, the predetermined period of time for interruption lapses, the CPU acts to cease the execution of the main control program and to initiate the execution of the interruption control program at a step 60 in FIG. 4. At a step 61, the CPU acts to store the speed pulses from sensor 16 in the RAM and the interruption control program proceeds to the following step 62 for discriminating the level of speed pulses. In case the level of speed pulses stored in the RAM is high, the CPU determines a "YES" answer at step 62 and the program proceeds to a step 64 to determine the level of flag $F_2$. At this stage, the CPU determines a "NO" answer because of the flag $F_2=0$ at step 41, and the program proceeds to a step 66 to set the flag $F_2=1$. When the program proceeds to the following step 67 through step 66, the CPU acts to reset a count data C of a counter in the RAM and subsequently acts at a step 68 to set the flag $F_1$ so as to end the execution of the interruption control program at a final step 72. In this embodiment, the counter in the RAM is responsive to the clock signals from the clock circuit to count a lapse of time while the speed pulses are maintained at the same level. Alternatively, if the CPU determines a "NO" answer at the prior step 62, the program will proceed to a step 63 where the CPU determines whether the flag $F_2=0$.

After the execution of such interruption control program, the main control program proceeds to its step 46 where the CPU determines a "NO" because of the setting of flag $F_1$ at the prior step 68. Thus, the CPU proceeds in the control program to the following step 47 to determine whether or not the vehicle engine is stopped. At step 47, the CPU determines a "NO" answer during generation of the high level voltage $H_i$ from regulator relay 15 causing the control program to go to a step 53 so as to determine a condition for a stopping of the engine. In this embodiment, the condition for a stopping of the engine is as follows: a second clutch signal from the second clutch switch 18b disappears and simultaneously the count data C by the counter in the RAM indicates a predetermined lapse of time, for instance 2 seconds, which is required for temporarily stopping the vehicle after depression of a brake pedal of the vehicle. If the predetermined lapse of time is not indicated by the count data C, the CPU determines a "NO" answer at step 53 to return the control program to the step 42.

When the interruption control program is subsequently executed by the CPU as described above, the speed pulses from sensor 16 are stored in the RAM at step 61. Assuming that at this stage the level of the speed pulses is low, the CPU determines a "NO" at step 62, and the program proceeds to step 63 to determine whether the flag $F_2$ is zero or not. As a result, the CPU determines a "NO" answer because of the flag $F_2=1$ at step 66 in the previous execution, and it acts to set the flag $F_2=0$ at the following step 65. Thereafter, the CPU acts to reset the count data C at step 67 and to set the flag $F_1$ at step 68 so as to end the execution of the interruption control program. When the main control program proceeds to step 46 after the execution described above, the CPU determines a "NO" answer thereby determining a "NO" answer respectively at steps 47 and 53. Alternatively, if the answer at step 62 is "YES" during the execution of the interruption control program, the CPU determines a "YES" answer at step 64 because of the flag $F_2=1$ in the previous execution, and the program proceeds to a step 69 for updating the count data C in the RAM. From the above description, it will be understood that the engine rotation during travel of the vehicle is maintained under control of the computer 20 in dependence upon a change of the level of speed pulses from sensor 16.

When the brake pedal is depressed to temporarily stop the vehicle, for instance at a street crossing, the second clutch switch 18b is opened by a full depression of the clutch pedal prior to stopping of the vehicle to generate a second clutch signal therefrom during the execution of the control programs respectively through the steps 42, 52, 46, 47 and 53 and through the steps 65 (or 66) and 68. After stopping the vehicle, the second clutch signal from switch 18b disappears in dependence upon release of the clutch pedal, and the speed sensor 16 produces a low level signal therefrom if the reed-switch 16b of sensor 16 is closed by magnetic coupling with disk 16a. Under such condition, the low level from sensor 16 is memorized in the RAM at step 61 during successive execution of the interruption control program, and the CPU determines a "NO" answer at step 62, and the program proceeds to step 63. At this stage, the CPU determines a "YES" answer at step 63 because of the flag $F_2=0$ in the previous execution and, the program proceeds to the following step 69 to set the count data $C=C+1$. When the program proceeds to a step 70 through step 69, the CPU determines whether or not 2 seconds have elapsed after reset of the count data C at step 67. If the answer to this question is "NO", the control program will end at step 72.

When the main control program proceeds to step 53 after the above execution of the interruption control program, CPU discriminates as "NO" in dependence upon the count data $C=C+1$ at the prior step 69 to return the program to the step 42. During successive execution of the control programs, the CPU determines a "NO" answer at steps 53 and 70 until 2 seconds elapse after reset of the count data C at step 67. Upon a lapse of 2 seconds after reset of the count data C, the CPU determines a "YES" answer at step 70 to set the count data $C=2$ seconds at the following step 71 and subsequently determines a "YES" answer at step 53, and the main control program proceeds to a step 54. Thus, the computer 20 produces an output signal for stopping the engine, and the transistor 33 is turned on in response to the output signal from computer 20 to energize the ignition relay 34 so as to open the normally closed contact 34b. As a result, the supply of electric current to ignition coil 12c is interrupted to stop the engine, and the regulator relay 15 generates a low level voltage $L_o$ therefrom.

When the main control program proceeds to step 47 through steps 50, 42 during a stopping of the engine, the CPU determines a "YES" answer, and the program proceeds to the following step 48 so as to discriminate whether a condition for activation of the starter motor 11 is satisfied or not. In this embodiment, the condition for activation of the starter motor 11 is arranged to be satisfied by the presence of a low level voltage $L_o$ from regulator relay 15 and a first clutch signal from first clutch switch 18a. Under release of the clutch pedal during a stopping of the engine, the first clutch switch 18a does not produce any first clutch signal. As a result, the CPU determines a "NO" answer at step 48 and subsequently determines a "NO" answer at step 50 to return the program to the step 42.

If the reed-switch 16b of sensor 16 is in its open position during a stopping of the vehicle, the speed sensor 16 produces a high level signal. Under such condition, the high level signal from sensor 16 is memorized in the RAM at step 61 during successive execution of the interruption control program, and the CPU determines a "YES" answer at step 62 causing the program to proceed to step 64. Then, the CPU determines a "NO" answer at step 64 because of the flag $F_2=0$ in the previous execution and subsequently acts to set the flag $F_2=1$ at step 66 so as to cause the program to proceed to step 72 through steps 67 and 68. When the interruption control program returns to steps 64, the CPU determines a "YES" answer because of the flag $F_2=1$ in the previous execution and causes the program to proceed to step 69 so as to update the count data $C=C+1$. Thereafter, the CPU determines a "NO" answer at steps 70 and 53 until 2 seconds elapse after reset of the count data C at step 67, as previously described. Upon a lapse of 2 seconds after reset of the count data C, the CPU determines a "YES" answer at step 70 and subsequently determines a "YES" answer at step 53 causing the main control program to proceed to step 54. Thus, the computer 20 produces an output signal for stopping the engine as described above.

When the clutch pedal is depressed to restart the vehicle, the first clutch switch 18a is closed to generate a first clutch signal therefrom, and in turn, the CPU determines a "YES" answer at step 48 during successive executions of the main control program due to the low level voltage $L_o$ from regulator relay 15 and the first clutch signal from switch 18a. This means that the condition for activation of the starter motor 11 has been satisfied. As a result, the CPU acts to produce an output signal for activating the starter motor 11 at the following step 49. Responsive to the output signal from the computer 20, the transistor 31 is turned on to energize the starter relay 32, and the normally open contact 32b of relay 32 is closed to allow supply of the electric current to the starter motor 11 from the power source 10. Thus, the starter motor 11 is activated by the supply of electric current to start the engine, and the regulator relay 15 cooperates with the alternator 14 to generate a high level voltage $H_i$ therefrom. Under such condition, the CPU determines a "YES" answer at step 50 and subsequently determines a "YES" answer at step 51 to generate an output signal for deactivating the starter motor 11. As a result, the transistor 31 is turned off in response to the output signal from the computer 20 to deenergize the stater relay 32, and the contact 32b of relay 32 opens to block the supply of electric current to the starter motor 11. Thus, the starter motor 11 is deactivated, and the vehicle is conditioned to restart under the automatic start and stop control of the engine.

If the vehicle door is opened during such transient arrest of the vehicle as described above, the door switch 19 is closed to generate a door signal therefrom. Under this condition, the CPU determines a "YES" answer at step 52 due to the door signal from switch 19 and acts to reset the flag $F_s$ at the following step 55. Subsequently, CPU acts to generate a deactivating signal at step 56 and to generate an activating signal at step 57. This means that the setting condition for the automatic start and stop control has been cancelled. Thus, the transistor 31 is turned off in response to the deactivating signal from the computer 20 to maintain the contact 32b of relay 32 in its open position so as to disable automatic activation of the starter motor 11, while the transistor 33 is turned off in response to the activating signal from the computer 20 to maintain the contact 34b of ignition relay 34 in its closed position so as to allow supply of the electric current to the ignition coil 12c from the power source 10. After cancelling the setting condition for automatic control, the engine is conditioned to start only by operation of the ignition switch 13.

In operation of the above embodiment, it is presumable that the actual speed of the vehicle may not be detected due to damage of the speed sensor 16, for example caused by disconnection of the speedometer cable 16c. Under such unexpected condition, the starter motor 11 is activated by operation of the ignition switch 13 to start the engine, and the regulator relay 15 generates a high level voltage $H_i$ under control of the alternator 14 in operation of the engine. When the main control program proceeds to step 42 after the vehicle door is closed and the setting switch 17 is actuated, the CPU determines a "YES" answer because of the reset of flag $F_s$ at step 41 or 55. At the following step 43, the CPU determines a "YES" answer because the setting condition is satisfied at the prior stage. Subsequently, the CPU acts to set the flag $F_s$ at step 44 and to reset the flag $F_1$ at step 45 and further determines a "YES" answer at step 46 on a basis of the reset flag $F_1$ to return the program to step 42. Then, the CPU determines a "NO" answer at step 42 in dependence upon the set flag $F_s$ causing the program to proceed to step 52. At this stage, the condition for cancelling the setting condition may not be satisfied due to disappearance of both the door and set signals. Thus, the CPU determines a "NO" answer at step 52 to return the program to step 42 through step 46, and the engine rotation is maintained during successive executions of the main control program through steps 42, 52 and 46.

When the vehicle restarts under the above condition, the speed sensor 16 does not produce any speed pulses in spite of rotation of the output shaft of the power transmission, and the reed-switch 16b is remained in its open or closed position. This results in inhibit of execution of the interruption control program. Thus, the engine rotation is reliably maintained during travel of the vehicle under successive executions of the main control program through steps 42, 52 and 46 as described above.

Although in the control programs of the above embodiment, the flag $F_1$ is set at step 68 and reset at step 45 to be determined at step 46, such flag $F_1$ may be replaced with the number of speed pulses from sensor 16 which is counted by a counter of CPU to reset the counted number at step 45 and determined the same with respect to a predetermined value at step 46 and to add the same a value of "1" at step 68. It is also noted that although the above embodiment has been adapted to gasoline engines, the present invention may be adapted to a Diesel engine. In such application of the present invention, the ignition circuit 12 is replaced with a fuel injection control device for the engine which is arranged under control of the ignition relay 34. In the actual practices of the present invention, the reed-switch 16b of sensor 16 may be replaced with an appropriate magnetic flux detector, and the speed sensor assembly 16 may be also replaced with a slotted disk and photo-coupler assembly. Alternatively, each disk of the sensor assemblies may be mounted on another rotary member operated at the actual vehicle speed.

What is claimed is:

1. A control system for controlling the operation of a vehicle prime mover comprising:

setting means for providing a set signal for control of the operation of said prime mover;

a starter control circuit which in its activated condition connects a starter motor of said prime mover to an electric power source and in its deactivated condition disconnects said starter motor from said power source;

a drive control circuit which in its deactivated condition maintains the operative condition of said prime mover and in its activated condition automatically renders said prime mover inoperative;

a mechanism for effecting movement of the vehicle;

detecting means for generating an electric signal indicative of motion of the vehicle; and an electric control device including first means for activating said starter control circuit in response to operation of said movement mechanism and for deactivating said starter control circuit in response to operation of said prime mover, second means for maintaining said drive control circuit in its deactivated condition in dependence upon said electric signal from said detecting means and for activating said drive control circuit when the level of said electric signal does not change during a stopping of the vehicle, and means for enabling the performance of the functions of said starter and drive control circuits in response to said set signal and said electric signal from said detecting means and for disabling the performance of the functions of said starter and drive control circuits when the level of said electric signal does not change during movement of the vehicle.

2. A control system according to claim 1, wherein said second means of said electric control device is arranged to activate said drive control circuit when the level of said electric signal from said detecting means does not change for a predetermined period of time after the vehicle stops.

3. A control system according to claim 1, wherein said detecting means is a speed sensor assembly for generating a series of speed pulses responsive to an actual speed of the vehicle, and wherein said second means of said electric control device is arranged to maintain said drive control circuit in its deactivated condition in dependence upon said speed pulses and to activate said drive control circuit when the level of said speed pulses does not change during a stopping of the vehicle, and said electric control device is arranged to enable the performance of the function of said starter and drive control circuits in response to said set signal and said speed pulses and to disable the performance of the functions of said starter and drive control circuits when the level of said speed pulses does not change during movement of the vehicle.

4. A control system according to claim 3, wherein said electric control device further comprises means for measuring a predetermined period of time in response to said speed pulses and for maintaining said drive control circuit in its deactivated condition until the predetermined period of time elapses after the vehicle stops.

5. A control system according to claim 1, wherein said electric control device further comprises door switch means cooperable with a vehicle door for generating a door signal when the vehicle door is opened, and means for disabling the performance of the functions of said starter and drive control circuits when said door signal is present.

6. A control system according to claim 1, wherein said electric control device further comprises door switch means cooperable with a vehicle door for generating a door signal when the vehicle door is opened, and means for deactivating said starter control circuit and activating said drive control circuit when said door signal is present.

7. A control system according to claim 1, wherein said electric control device further comprises means for disabling the performance of the functions of said starter and drive control circuits when applied with said set signal from said setting means during the performance of the functions of said control circuits.

* * * * *